(12) United States Patent
Ooi et al.

(10) Patent No.: US 10,501,187 B2
(45) Date of Patent: Dec. 10, 2019

(54) AIRCRAFT LAVATORY

(71) Applicant: JAMCO CORPORATION, Mitaka-shi, Tokyo (JP)

(72) Inventors: Kouichi Ooi, Mitaka (JP); Yoshihisa Tsutsui, Mitaka (JP)

(73) Assignee: JAMCO CORPORATION, Mitaka-shi (JP)

( * ) Notice: Subject to any disclaimer, the term of this patent is extended or adjusted under 35 U.S.C. 154(b) by 228 days.

(21) Appl. No.: 15/559,522

(22) PCT Filed: Apr. 6, 2015

(86) PCT No.: PCT/JP2015/060728
§ 371 (c)(1),
(2) Date: Sep. 19, 2017

(87) PCT Pub. No.: WO2016/162919
PCT Pub. Date: Oct. 13, 2016

(65) Prior Publication Data
US 2018/0118345 A1  May 3, 2018

(51) Int. Cl.
*B64D 11/02* (2006.01)
(52) U.S. Cl.
CPC .................... *B64D 11/02* (2013.01)
(58) Field of Classification Search
CPC ............ B64D 11/02; B64D 2011/0046; B64C 2211/00; E04G 23/02; B66B 7/00; E04B 1/348
See application file for complete search history.

(56) References Cited

U.S. PATENT DOCUMENTS

| | | | | |
|---|---|---|---|---|
| 4,055,317 A | * | 10/1977 | Greiss | B64D 11/00 244/118.5 |
| 5,314,143 A | * | 5/1994 | Luria | B64D 11/0007 104/88.01 |
| 7,083,145 B2 | * | 8/2006 | Mills | B64D 11/00 244/118.5 |

(Continued)

FOREIGN PATENT DOCUMENTS

| EP | 1279593 A2 * | 1/2003 | ............. B64D 11/00 |
|---|---|---|---|
| EP | 1293425 A2 | 3/2003 | |

(Continued)

OTHER PUBLICATIONS

JP2013032663EnglishTranslation.*

(Continued)

*Primary Examiner* — Assres H Woldemaryam
(74) *Attorney, Agent, or Firm* — Westerman, Hattori, Daniels & Adrian, LLP

(57) ABSTRACT

In providing an aircraft lavatory unit capable of suppressing cost and time for installation in a case where a lavatory unit and an ascending/descending unit are to be installed on the aircraft, the present invention provides an aircraft lavatory unit in which a lavatory area and an ascending/descending area are integrally formed, wherein an ascending/descending mechanism which connects to an upper floor or a ceiling space of the aircraft lavatory unit inside the ascending/descending area is provided on a wall surface dividing the lavatory area and the ascending/descending area.

8 Claims, 1 Drawing Sheet

(56) References Cited

U.S. PATENT DOCUMENTS

| | | | |
|---|---|---|---|
| 2003/0019976 A1* | 1/2003 | Cheung | B64D 11/00 244/118.5 |
| 2003/0168281 A1 | 9/2003 | Olliges et al. | |
| 2005/0023413 A1 | 2/2005 | Saint-Jalmes | |
| 2008/0149766 A1* | 6/2008 | Saint-Jalmes | B64D 11/00 244/118.6 |
| 2009/0050738 A1* | 2/2009 | Breuer | B64D 11/02 244/118.5 |
| 2010/0155531 A1 | 6/2010 | Lynas | |
| 2011/0139930 A1 | 6/2011 | Sütthoff et al. | |
| 2014/0165285 A1 | 6/2014 | Durand et al. | |
| 2017/0233058 A1* | 8/2017 | Brunaux | B64C 1/00 244/118.6 |

FOREIGN PATENT DOCUMENTS

| | | | | |
|---|---|---|---|---|
| JP | 2005-532952 A | | 11/2005 | |
| JP | 2010-525991 A | | 7/2010 | |
| JP | 2013-32663 A | | 2/2013 | |
| JP | 2013032663 A | * | 2/2013 | B66B 7/00 |

OTHER PUBLICATIONS

Extended (supplementary) European Search Report dated Jul. 23, 2018, issued in counterpart European Application No. 15888414.8. (7 pages).

International Search Report dated Jun. 30, 2015, issued in counterpart International Application No. PCT/JP2015/060728 (2 pages).

Notification of Reasons for Refusal dated Dec. 20, 2016, issued in counterpart Japanese Patent Application No. 2015-560418, with English translation (6 pages).

Decision of Refusal dated Aug. 1, 2017, issued in counterpart Japanese Patent Application No. 2015-560418, with English translation (4 pages).

* cited by examiner

AIRCRAFT LAVATORY

TECHNICAL FIELD

The present invention relates to a lavatory (toilet) applied to a passenger aircraft.

BACKGROUND ART

Passenger aircrafts are designed with the aim to secure as much passenger seats as possible, in order to allow many passengers to be on board the aircrafts for commercial reasons, but increasing the number of passenger seats leads to increasing the number of lavatories (toilets) to be provided, so that limited spaces on the aircrafts must be utilized efficiently.

In response to such demands, a configuration is known where an interior of an aircraft is divided into an upper deck and a lower deck, wherein cabin modules are arranged on each of the upper deck and the lower deck, and the upper deck and the lower deck are designed to be connected to a staircase that is disposed separately, through which passengers are enabled to move up and down (refer to Patent Literature 1).

Similarly, a method is known where a toilet facility is arranged in a space below a floor of a passenger deck or in a space above a ceiling of the passenger deck of an aircraft, and a staircase is connected from the passenger deck to a toilet space so as to allow efficient use of a floor space of the passenger deck, and reduce the floor space used for installing the toilet facility in the aircraft (refer to Patent Literature 2).

CITATION LIST

Patent Literature

[PTL 1] Japanese Translation of PCT International Application Publication No. JP-T-2005-532952
[PTL 2] Japanese Translation of PCT International Application Publication No. JP-T-2010-525991

SUMMARY OF INVENTION

Technical Problem

According to the arrangement disclosed in Patent Literatures 1 and 2, however, it is necessary to provide a staircase unit as a separate member so that a person may move to upper and lower floors from the deck of the cabin, and there was a drawback that time and cost was required to independently manufacture and install the lavatory unit and the staircase unit.

Therefore, the present invention provides an aircraft lavatory unit capable of suppressing cost and time for installation in a state where the lavatory unit and an ascending/descending unit are installed.

Solution to Problem

In order to solve the problems mentioned above, the aircraft lavatory unit according to the present invention includes a lavatory area and an ascending/descending area which are formed integrally, wherein an ascending/descending mechanism connecting to an upper floor or a ceiling space of the aircraft lavatory unit within the ascending/descending area is provided on a wall surface that divides the lavatory area and the ascending/descending area.

According to one aspect of the present invention, the ascending/descending mechanism is a staircase arranged on the wall surface, and a storage space is provided on a back side of the staircase in the ascending/descending area.

According to another aspect of the present invention, the ascending/descending mechanism can be a ladder arranged on the wall surface. Further, the ascending/descending mechanism can be an elevator arranged on the wall surface.

According to yet another aspect of the present invention, the lavatory area includes a door provided at a position facing the wall surface, and a toilet unit provided on the wall surface side and facing the door, and wherein the ascending/descending area has an entrance on an opposite side from the door intervening the wall surface.

Advantageous Effects of Invention

The present invention provides an aircraft lavatory unit capable of suppressing cost and time for installing a lavatory unit and an ascending/descending unit.

Further, in a case where a staircase is used as the ascending/descending unit, an additional storage space can be secured.

DESCRIPTION OF EMBODIMENTS

Figure 1:
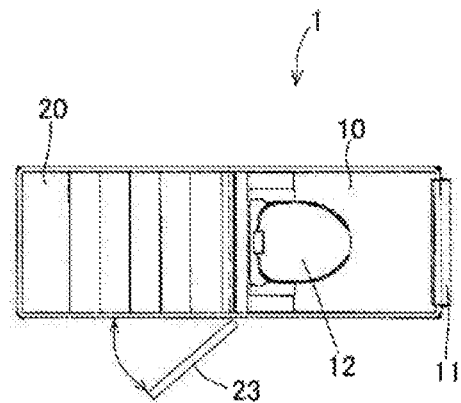
FIG. 1 is a plan view illustrating an outline of an aircraft lavatory unit according to the present invention.
Figure 2:
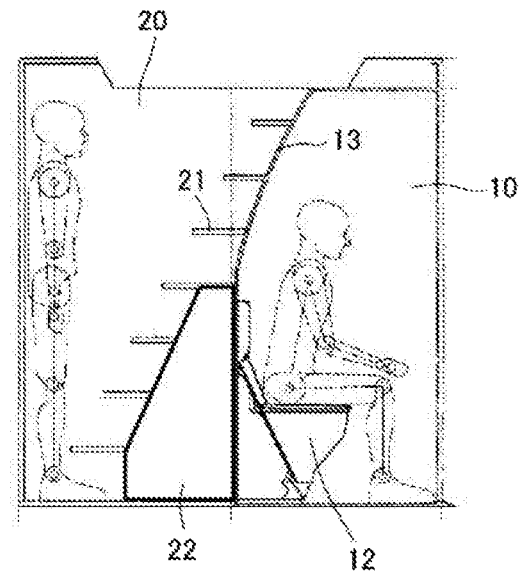
FIG. 2 is a side view illustrating an outline of the aircraft lavatory unit according to the present invention.

FIG. 1 is a plan view illustrating an outline of an aircraft lavatory unit according to the present invention. FIG. 2 is a side view of the aircraft lavatory unit illustrated in FIG. 1.

In FIG. 1, a ceiling member of the lavatory unit is not shown, and in FIG. 2, a side wall member of the lavatory unit is not shown.

As illustrated in FIGS. 1 and 2, an aircraft lavatory unit 1 according to the present invention is formed by integrally assembling a lavatory area 10 and an ascending/descending area 20.

A door 11 for entering into and exiting from the lavatory area 10 and a toilet unit 12 are provided in the lavatory area 10.

As illustrated in FIG. 2, the toilet unit 12 is arranged so that a person faces the door 11 when he or she seats thereon, and a wall surface 13 positioned on a rear side of the toilet unit 12 is designed to overhang further toward the door 11 at positions closer to a ceiling.

According to this arrangement, the width of the lavatory unit 10 can be reduced.

Meanwhile, as illustrated in FIG. 2, an entrance (not shown) is formed in the ascending/descending area 20 on an opposite side from the door 11 of the lavatory area 10, and an inclined surface gradually receding from the entrance side toward the ceiling is formed. In this structure, a part of the inclined surface is designed to have a shape that matches the overhanging shape of the wall surface 13 in the lavatory area 10.

By adopting such a shape, a sufficient length for providing a staircase on an inclined portion from an entrance to an upper floor or a ceiling space can be ensured for an ascending/descending person.

A storage space 22 having an approximately triangular shape in side view is formed on a rear side of the inclined surface in the ascending/descending area 20. By providing an opening/closing door 23 on a side wall of the storage space 22, the storage space 22 can be accessed from an exterior of the unit.

Further, if the aircraft lavatory unit 1 according to the present invention is adopted in a layout where passages cannot be arranged on both sides of the door 11 (such as in a case where seats, galleys and so on are arranged on the side wall side of the unit), it may be possible to provide a function as an opening/closing door to a part of a staircase unit 21 at a position corresponding to the storage space 22 of the ascending/descending area 20.

According to this configuration, it becomes possible to access the interior of the storage space 22 from the ascending/descending area 20, and also to improve freedom of layout of the aircraft lavatory unit 1 according to the present invention.

According to the lavatory unit having such configuration, the wall surface shape of the lavatory area is utilized to integrally form the ascending/descending mechanism such as the staircase unit, there is no need to manufacture the lavatory area and the ascending/descending area individually, such that costs can be suppressed, and time required for installation can be reduced.

Moreover, by arranging the toilet unit to face the door, the total width of the lavatory unit can be reduced, and a space can be saved.

The aircraft lavatory according to the present invention is not restricted to the embodiments described above, and allows various modifications.

Further, a configuration can be added to, deleted from or replaced with a part of the configuration of the aircraft lavatory according to the present invention within the technical scope of the present invention.

According to the above-described embodiment, an example is illustrated where a staircase unit is provided as an ascending/descending unit, but a ladder or an electrically operated ascending/descending unit (such as an elevator) can also be adopted as the ascending/descending unit.

By applying such arrangement, ascending/descending can be realized approximately perpendicularly on the wall surface of the lavatory area without inclining the wall surface, and an overall length of the lavatory unit can be further reduced to save space even further.

REFERENCE SIGNS LIST 1 lavatory unit
10 lavatory area
11 door
12 toilet unit
13 wall surface
20 ascending/descending area
21 staircase unit
22 storage space

The invention claimed is:

1. An aircraft lavatory unit comprising a lavatory area and an ascending or descending area which are formed integrally,
wherein the unit comprises a staircase on an inclined surface, the staircase connecting to an upper floor or a ceiling space of the aircraft lavatory unit inside the ascending or descending area, a wall surface divides the lavatory area and the ascending or descending area and overhangs the lavatory area towards a ceiling,
a part of the inclined surface has a shape matching the overhanging shape of the wall surface, and
a storage space is provided between a rear side of the inclined surface on which the staircase is provided and the wall surface.

2. The aircraft lavatory unit according to claim 1,
wherein the lavatory area comprises a door provided at a position facing the wall surface, and a toilet unit provided on the wall surface side and facing the door, and
the ascending or descending area has an entrance on an opposite side from the door intervening the wall surface.

3. The aircraft lavatory unit according to according to claim 1, wherein the storage space has approximately a triangular shape in side view.

4. The aircraft lavatory unit according to according to claim 2, wherein the storage space has approximately a triangular shape in side view.

5. The aircraft lavatory unit according to claim 1, wherein the aircraft lavatory unit has a door on a side wall of the storage space, the door being arranged so that the storage space can be accessed from an exterior of the unit.

6. The aircraft lavatory unit according to claim 2, wherein the aircraft lavatory unit has a door on a side wall of the storage space, the door being arranged so that the storage space can be accessed from an exterior of the unit.

7. The aircraft lavatory unit according to claim 1, wherein the aircraft lavatory unit has a door to the storage space, the door being arranged in a part of the staircase in the ascending or descending area.

8. The aircraft lavatory unit according to claim 2, wherein the aircraft lavatory unit has a door to the storage space, the door being arranged in a part of the staircase in the ascending or descending area.

* * * * *